United States Patent Office 3,560,411
Patented Feb. 2, 1971

3,560,411
EPOXYALKYL ESTERS OF ENDO-METHYLENE HEXAHYDROPHTHALIC ACID
Klaas Ruyter and Geert C. Vegter, Amsterdam, Netherlands, assignors to Shell Oil Company, New York, N.Y., a corporation of Delaware
No Drawing. Filed Dec. 9, 1968, Ser. No. 782,413
Claims priority, application Great Britain, Jan. 17, 1968, 2,557/68
Int. Cl. C08g 30/10
U.S. Cl. 260—2
9 Claims

ABSTRACT OF THE DISCLOSURE

Composition containing one or more novel di epoxy alky and epoxy cyclo alkyl esters of unsubstituted or alkyl substituted bicyclo[2,2,1] - heptane - 2,3 - dicarboxylic acids which can be cured to useful resins.

BACKGROUND OF THE INVENTION

The invention relates to a new class of carboxylic acid esters.

The invention also relates to curable compositions comprising one or more of these novel carboxylic acid esters, and to the cured resins which can be obtained by curing said compositions.

It is known that epoxyalkyl esters of dicarboxylic acids, such as tetrahydrophthalic acid, hexahydrophthalic acid, and bicyclo[2,2,1] - 5 - heptene - 2,3 - dicarboxylic acid have found application in the preparation of cured resins, which resins are obtained by curing the above-mentioned esters with a curing agent (the term epoxy alkyl as hereinafter used in this specification includes epoxy cyclo alkyl).

The cured resins obtained by curing the epoxyalkyl esters of the dicarboxylic acids mentioned above with e.g. hexahydrophthalic anhydride as a curing agent have good resistance to chemicals. However, the cured resins prepared from these epoxyalkyl esters are deficient in one or more of the following properties: Vicat softening point, Barcol hardness, outdoor stability, and impact strength.

It has now been discovered that cured resins obtained from compositions comprising a class of novel epoxyalkyl esters surprisingly do not possess any of these disadvantages.

SUMMARY OF THE INVENTION

This invention relates to novel diepoxy alkyl and diepoxy cyclo alkyl esters of unsubstituted or alkyl substituted bicyclo[2,2,1] - heptane - 2,3 - dicarboxylic acids and compositions of one or more of these esters which can be cured to resins having outstanding combinations of properties. These excellent properties are measured by tests for Vicat softening point, Barcol hardness, outdoor stability and impact strength render cured compositions of one or more of these esters suitable for coating, castings, adhesives, sealing compositions and especially suitable for outdoor insulation of high-voltage apparatus e.g. insulators for high voltage electric supply lines.

DESCRIPTION OF PREFERRED EMBODIMENT

The novel class of epoxyalkyl esters of carboxylic acids according to the invention have the general formula:

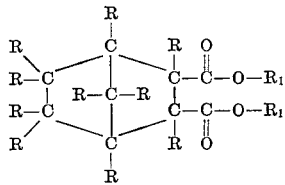

wherein R, which may be similar or dissimilar, denotes hydrogen or an alkyl group with at most 9 carbon atoms, and $R_1$, which may be similar or dissimilar, denotes an epoxyalkyl group with 3 to 18 carbon atoms, can be prepared in several ways.

These esters are most conveniently prepared by reaction of the corresponding dicarboxylic acids or derivatives (e.g. salts, preferably alkali salts) thereof with epoxyalkyl group-containing compounds (e.g. monohalogenated epoxyalkyl compounds). Preferably monochlorinated epoxyalkyl compounds with 3 to 18 carbon atoms are used. So, for example, 2,3-epoxypropyl esters are obtained by reacting an alkali metal salt (e.g. the disodium salt) of the dicarboxylic acid concerned with epichlorohydrin.

The acids used to make the esters can be obtained by hydrogenating substituted or unsubstituted bicyclo[2,2,1] - 5 - heptene-2,3-dicarboxylic acids or their salts. These acids or salts can be obtained by hydrolysis of the corresponding unsaturated anhydrides which are easily accessible by the general technique described by Diels and, Alder, Ann. 460:98 (1928), by reaction of substituted or unsubstituted cyclopentadiene with maleic anhydride or alkyl-substituted maleic anhydrides such as citraconic anhydride at room temperature in an inert solvent such as benzene.

The novel epoxyalkyl esters of carboxylic acids according to the invention can also be prepared by hydrogenation of epoxyalkyl esters (e.g. the di(2,3-epoxystearyl)ester of substituted or unsubstituted bicyclo[2,2,1] - 5 - heptene-2,3-dicarboxylic acids), which esters can be obtained by reaction of substituted or unsubstituted bicyclo[2,2,1]-5-heptene - 2,3-dicarboxylic acids or derivatives thereof with an epoxy group containing compounds. For example, the 2,3 - epoxypropyl ester of bicyclo[2,2,1] - 5 - heptene-2,3-dicarboxylic acid can be obtained by reaction of an alkali salt (e.g. sodium salt) of the acid with epichlorohydrin.

The novel epoxyalkyl esters according to the invention can also be prepared by reaction of substituted or unsubstituted cyclopentadiene with di(epoxyalkyl)esters of substituted or unsubstituted maleic acid, followed by hydrogenation of the resulting epoxyalkyl ester of a bicyclo [2,2,1] - 5 - heptene - 2,3-dicarboxylic acid as mentioned above.

According to the invention a composition is provided curable with the aid of one or more curing agents to cured resins which composition comprises one or more of the foregoing carboxylic acid esters.

Carboxylic acid esters of unsubstituted or methyl substituted acids are preferred. Esters of acids substituted with a single alkyl group are especially preferred.

The epoxy alkyl group suitably contain 3 to 9 carbon atoms; 2,3-epoxyalkyl groups are very suitable, the 2,3-epoxypropyl group being preferred.

The most preferred esters of the group of novel esters suitable for the compositions according to the invention are the di(2,3 - epoxypropyl)ester of bicyclo[2,2,1]heptane - 2,3 - dicarboxylic acid and the di(2,3-epoxy-propyl) esters of methylbicyclo[2,2,1]heptane - 2,3 - dicarboxylic acids.

The compositions according to the invention may also contain a minor amount of other compounds such as other di- or polyepoxy compounds which can be cured with curing agents to cured resins.

It is to be understood that the amount of other compounds such as other di- and/or polyepoxides which may be present in the compositions, must be kept below a certain level (e.g. below 20% by weight) which level depends on the structure of these other compounds, since the superior properties of the cured resins obtained after curing owing to the presence in the compositions of the novel epoxyalkyl esters according to the invention, must not be impaired.

Examples of other di- or polyepoxy compounds which may be present in the compositions include esters which contain epoxy groups and/or ethers which contain epoxy groups and/or hydrocarbons which contain epoxy groups.

Examples of esters which contain epoxy grups are di(2,3-epoxypropyl)esters of phthalic acid, terephthalic acid, tetrahydrophthalic acid, hexahydrophthalic acid, [2,2,1]-5-heptene-2,3-dicarboxylic acid and di- or poly-(2,3-epoxypropyl)esters of polymerized unsaturated fatty acids. Other examples of esters which contain epoxy groups are the 3,4-epoxy-6-methylcyclohexylmethyl ester of 3,4-epoxy-6-methylcyclohexanecarboxylic acid, the 3,4-epoxy-6-methylcyclohexyl ester of 3,4-epoxycyclohexanecarboxylic acid and the di(3,4-epoxy-6-methylcyclohexylmethyl)ester of adipic acid. Examples of ethers which contain epoxy groups are the epoxy groups containing compounds which can be obtained by reaction of bisphenols and epichlorohydrin under suitable conditions, such as the reaction product of epichlorohydrin and 2,2-bis(4-hydroxyphenyl)propane in the presence of an alkali hydroxide, and the di- and polyglycidyl ethers of aliphatic polyhydroxy compounds such as ethylene glycol, glycerol, trimethylolpropane and pentaerythritol. As an example of hydrocarbons which contain epoxy groups mention can be made of epoxidized aliphatic unsaturated hydrocarbons such as epoxidized polybutadienes, epoxidized unsaturated cycloaliphatic compounds such as dicyclopentadiene diepoxide and vinylcyclohexene diepoxide.

The compositions according to the invention can be cured to resins with a curing agent. As example of curing agents may be mentioned di- and polyamines, di- and polybasic carboxylic acids and anhydrides thereof, mixtures of polycarboxylic acid anhydrides with polyols and polymercaptans. Anhydrides of dibasic carboxylic acids such as phthalic anhydride, hexahydrophthalic anhydride, methylhexahydrophthalic anhydride, tetrahydrophthalic anhydride, methyltetrahydrophthalic anhydride, maleic anhydride, methylbicyclo[2,2,1]-5-heptene-2,3-dicarboxylic anhydride, bicyclo[2,2,1]-5-heptene-2,3-dicarboxylic anhydride, methylbicyclo[2,2,1]-heptane-2,3-dicarboxylic anhydride and bicyclo[2,2,1]heptane-2,3-dicarboxylic anhydride are especially suitable.

The amount of the curing agent employed will vary depending on the type of curing agent selected. Amines, acids and anhydrides are preferably employed in equivalent amounts from 0.6 to 1.5, one equivalent amount being sufficient to furnish one active hydrogen atom or one carboxylic acid group or one anhydride group for each epoxy group.

If the compositions are cured with the aid of anhydrides of di- or polybaisc acids it is advisable to add a curing accelerator. Tertiary amines are very suitable, α-methylbenzyldimethylamine being preferred. The amount of accelerator can vary between wide limits, amounts between 0.1 and 1.0% w., calculated on epoxy compounds present, being preferred.

Curing of the compositions according to the invention cured resins may be accomplished by merely mixing the above-mentioned curing agents with said compositions. The most active curing agents, such as aliphatic polyamines are reactive at room temperature and application of heat is not necessary to effect the cure. On the other hand, di- and polycarboxylic acids and anhydrides are less active curing agents, and it is desirable to apply heat to speed the cure. Temperatures of 50° up to 250° C. are suitable, temperatures between 100° and 200° C. being preferred.

The curing agents to be used may be part of the compositions according to the invention. In general, the more active curing agents shall be added to the compositions which do not contain a curing agent shortly before curing is to be accomplished. The less active curing agents, such as anhydrides, may be present for a somewhat longer time in the compositions, curing being accomplished at the desired moment of heating.

The new compositions according to the invention may contain various additives such as plasticizers, stabilizers, pigments and extenders such as oils, resins, tar, pitches and petroleum distillates, and curing can be accomplished in the presence of these additives.

The compositions according to the invention may be utilized for a variety of applications. They are very suitable for the preparation by curing of coatings, impregnating and sealing compositions, foams, pottings, castings, shaped articles, adhesives and the like.

The cured compositions according to the invention are especially suitable for electric insulation purposes. They can very advantageously be applied for insulating high-voltage apparatus and are most of all suitable for outdoor insulators to be used for high-voltage electric supply lines.

Example I

Preparation of the di(2,3-epoxypropyl)ester of bicyclo-[2,2,1]heptane-2,3-dicarboxylic acid.

Step 1: To a stirred suspension of 98 g. (1 mol) maleic anhydride was gradually added 66 g. (1 mol) cyclopentadiene at a temperature of 8–10° C. The anhydride of the bicyclo[2,2,1]-5-heptene-2,3-dicarboxylic acid, formed crystallized and was filtered off. The yield was nearly quantitative.

Step 2: The anhydride obtained in step 1 was hydrolysed to form the acid by boiling with water, and the acid obtained was neutralized with sodium hydroxide. The sodium salt was hydrogenated by contacting a 15% w. solution of the salt in water with hydrogen at a pressure of 1.1 atmosphere in the presence of finely divided platinum as a catalyst (0.2 g. platinum per mol of salt) at room temperature for 12 hours. The platinum was filtered off and bicyclo[2,2,1]heptane-2,3-dicarboxylic acid was obtained as a precipitate in 95% yield by acidification of the solution with hydrochloric acid. The equivalent weight of the acid was 95 (theoretical 92).

Step 3: A mixture of 190 g. bicyclo[2,2,1]heptane-2,3-dicarboxylic acid, 1850 g. epichlorophydrin and 1.6 g. tetraethylammonium bromide (a catalyst) were heated at reflux temperature for 15 minutes. 240 g. of 48% solution of potassium hydroxide in water was gradually added in 48 minutes, with removal of the water added and the water formed during the reaction of a constant boiling mixture with epichlorohydrin. The water was continuously separated from the epichlorohydrin and the latter reintroduced to the reaction mixture. After addition of the potassium hydroxide solution refluxing and removal of water were continued for another 15 minutes. After cooling the excess epichlorohydrin was distilled off at a pressure of 15 mm. Hg and a maximum bottom temperature of 80° C. Subsequently 450 g. methyl isobutyl ketone was added, and the solution so obtained was washed several times with water and 10% $Na_2SO_4$ solution. After drying over molecular sieves the methyl isobutyl ketone was distilled off, and the ester heated at 110° C. at a pressure of 1–2 mm. Hg for 0.5 hour. The di(2,3-epoxypropyl)ester of bicyclo[2,2,1]heptane - 2,3 - dicarboxylic acid was obtained in 83.5% yield and contained 506 meq. epoxy per 100 g. (theoretical 671), had an $n_D^{20}$ of 1.052, a $d_{25}^{25}$ of 1.24, a viscosity of 50 poises, at 24° C., a boiling point of 188° C,/0.23 mm. and a color below 1 on the Gardner scale.

Example II

Example I is repeated except that in step 1, the maleic anhydride is replaced with citraconic anhydride to prepare a methyl bicyclo[2,2,1]-5-heptene-2,3-dicarboxylic acid. The di(2,3-epoxy propyl)ester is then prepared and related results obtained.

Example III

Example I is repeated except that in step 3, the epichlorohydrin is replaced with 1 chloro-2,3-epoxy-6-cyclohexyloctane. Related results are obtained.

Example IV

Preparation of a cured resin.—The di(2,3-epoxypropyl) ester of bicyclo[2,2,1]heptane-2,3-dicarboxylic acid was cured with such an amount of hexahydrophthalic anhydride that one anhydride group was present per epoxy group by heating at 140° C. for 16 hours in the presence of 0.5% w. on epoxypropyl ester of α-methylbenzyldimethylamine as an accelerator. Properties of the cured resin determined included the impact strength according to British Standards 2782 part III, the Vicat softening point according to British Standards 2782 part I, the Barcol hardness according to H.J. Hruska, Iron Age, 152 No. 16, 84 (1943) and the outdoor stability. Outdoor stability was determined by change in gloss after exposing a white-pigmented cured resin to atmospheric influences for six months on the roof of a building. The gloss, which prior to exposure was good, was determined according to ASTM method D 523. Ratings are given as percentages of original gloss. The results of the tests are given in Table I.

Example V

For comparative purposes the di(2,3-epoxypropyl) esters of bicyclo[2,2,1]-5-heptene-2,3 dicarboxylic acid, tetrahydrophthalic acid and hexahydrophthalic acid were cured in the same way as described in Example II for the di(2,3-epoxypropyl)ester of bicyclo[2,2,1]heptane-2,3-dicarboxylic acid. Of the cured resins obtained the same properties were determined as of the cured resin described in Example I. The results are incorporated in the Table I.

TABLE I

| | Cured resin prepared from the di(2,3-epoxypropyl)ester of— | | | |
|---|---|---|---|---|
| | Bicyclo[2,2,1]heptane-2,3-dicarboxylic acid | Bicyclo[2,2,1]5-heptene-2,3-dicarboxylic acid | Hexahydrophthalic acid | Tetrahydrophthalic acid |
| Barcol hardness | 39 | 35 | 35 | 33 |
| Vicat softening temp., ° C. at penetration of— | | | | |
| 0.1 mm | 109 | 112 | 105 | 87 |
| 0.2 mm | 116 | 120 | 108 | 92 |
| 0.5 mm | 121 | 126 | 112 | 96 |
| 1.0 mm | 128 | 138 | 119 | 100 |
| Impact strength (BS Izod notched), kg./cm.² | 4.6 | 3.7 | 2.5 | 3.1 |
| Gloss after 6 months exposure to atmosphere (percent of original) | 100 | 30 | 100 | 60 |

We claim as our invention:

1. A vicinal epoxy alkyl ester of bicyclo[2,2,1]heptane-2,3-dicarboxylic acid wherein the epoxy alkyl groups contain 3 to 18 carbon atoms.

2. A dicarboxylic acid ester of the general formula

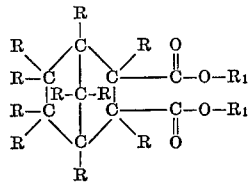

wherein R, which may be similar or dissimilar, denotes hydrogen or an alkyl group containing 1 to 9 carbon atoms, and $R_1$ which may be similar or dissimilar, denotes a vicinal epoxyalkyl group with 3 to 18 carbon atoms.

3. A composition according to claim 2 wherein the dicarboxylic acid is a methyl bicyclo[2,2,1]heptane-2,3-dicarboxylic acid.

4. The diepoxypropyl ester of bicyclo[2,2,1]heptane-2,3-dicarboxylic acid and the di 2,3-epoxypropyl ester of methyl bicyclo[2,2,1]heptane-2,3-dicarboxylic acids.

5. A composition comprising:
    (a) one or more carboxylic acid esters of the general formula:

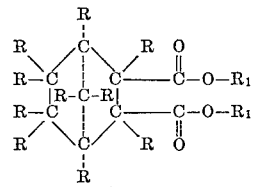

wherein R, which may be similar or dissimilar denotes hydrogen or an alkylgroup containing 1–9 carbon atoms, and $R_1$, which may be similar or dissimilar, denotes a vicinal epoxyalkyl group containing 3–18 carbon atoms, and
    (b) a curing amount of an epoxy curing agent.

6. A composition according to claim 5 containing an amount of curing accelerator between 0.1 and 1.0% w., calculated on epoxy compounds present.

7. Cured compositions according to claim 5.

8. A composition according to claim 5 wherein $R_1$, which may be similar or dissimilar, denotes a vicinal epoxyalkyl group containing 3 to 9 carbon atoms.

9. A composition according to claim 5 wherein the carboxylic acid esters are one or more of the vicinal epoxy alkyl esters of a methyl bicyclo[2,2,1]heptane-2,3-dicarboxylic acid.

References Cited

Chemical Abstracts, 67, 91359 w, (1967).

WILLIAM H. SHORT, Primary Examiner

E. A. NIELSEN, Assistant Examiner

U.S. Cl. X.R.

156—330; 260—348